(12) United States Patent
Ogram

(10) Patent No.: US 9,665,747 B1
(45) Date of Patent: May 30, 2017

(54) ENHANCED CREDIT CARD AND SYSTEM THEREFOR

(71) Applicant: Mark Ellery Ogram, Tucson, AZ (US)

(72) Inventor: Mark Ellery Ogram, Tucson, AZ (US)

( * ) Notice: Subject to any disclaimer, the term of this patent is extended or adjusted under 35 U.S.C. 154(b) by 0 days.

(21) Appl. No.: 14/999,522

(22) Filed: May 18, 2016

(51) Int. Cl.
*G06K 7/08* (2006.01)
*G06K 9/00* (2006.01)

(52) U.S. Cl.
CPC ......... *G06K 7/087* (2013.01); *G06K 9/00892* (2013.01)

(58) Field of Classification Search
None
See application file for complete search history.

(56) References Cited

U.S. PATENT DOCUMENTS

| | | | | |
|---|---|---|---|---|
| 5,538,291 A | * | 7/1996 | Gustafson | B42D 25/00 235/487 |
| 8,328,106 B1 | * | 12/2012 | Trujillo | G06K 19/041 235/449 |
| 2009/0283586 A1 | * | 11/2009 | Cecere | G06Q 20/20 235/380 |

* cited by examiner

*Primary Examiner* — Kristy A Haupt
(74) *Attorney, Agent, or Firm* — Mark Ogram

(57) ABSTRACT

The invention is a credit card system which utilizes a substrate having a machine readable user account number and, a user removable portion of the substrate. The credit card identifies if the user removable portion of the substrate has been disturbed, the reader requests a secondary user identification to verify that the user is authorized to use the credit card.

13 Claims, 2 Drawing Sheets

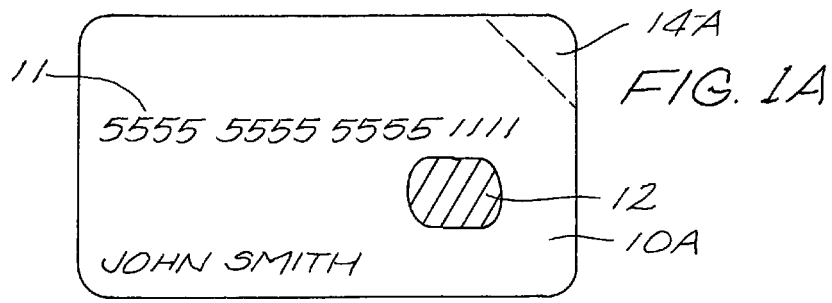
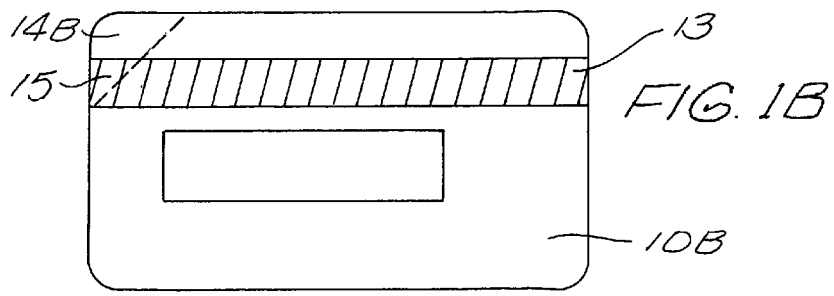
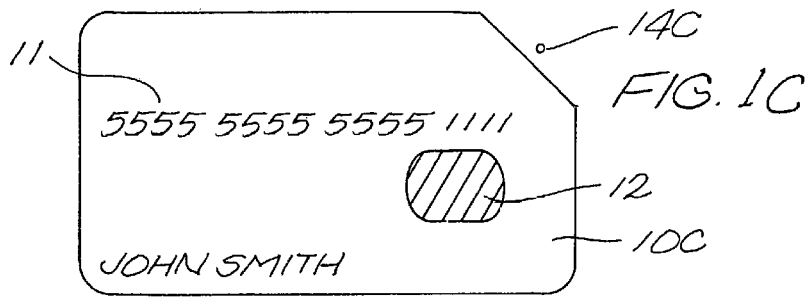
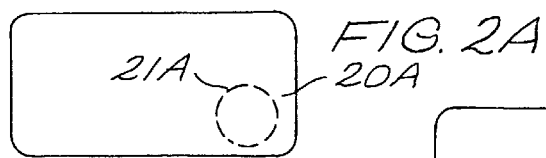
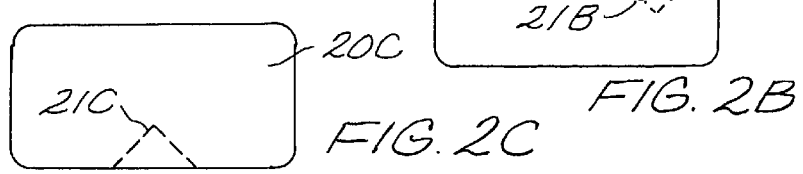
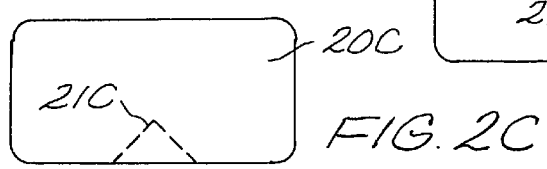

ENHANCED CREDIT CARD AND SYSTEM THEREFOR

BACKGROUND OF THE INVENTION

This invention relates generally to credit cards and more specifically to the enhancement of their security.

Credit card usage is growing at astounding rates and has supplanted currency and even coinage for many uses. The reason for this growth is that there have been vast advances in the credit cards themselves and by advances in the banking systems.

Equipped with Radio Frequency Identification (RFID) capability, these advanced cards allow the user to quickly get verification on the card's usage and often only require a "passage" of the card close to the reader.

Further, banks and card issuing entities have relaxed the signature requirements for small purchases and the fees charged to merchants have been relaxed allowing the credit cards be used for what are known as "micro-purchases" (small amounts).

While these advances In technology and procedure have expanded the reach of applications for credit cards, it has also opened up significant potential for fraud. A stolen card can now be used by anyone without any verification whatsoever.

Because of this, many owners of credit cards have put "See ID" or "CID" on the signature line on the back of the credit card. This is an attempt by the owner to make sure that if the card is stolen, without picture identification, the card cannot be used.

Unfortunately, this requirement is missed by merchant for the majority of charges. In fact, owners who have so marked their credit cards are amazed when the legend actually works.

It is clear there is a need to improve credit card security.

SUMMARY OF THE INVENTION

The invention is a credit card system which utilizes a substrate having a machine readable user account number. In this facet, the credit card is identical to a traditional credit card and can be used in the same manner, with or without an RFID. For the present invention though, the physical structure of the credit cards is alterable by the owner/user.

Credit cards, which include debit cards, and their structure are well known to those of ordinary skill in the art and include those described in U.S. Pat. No. 9,224,141 B1 entitled "Encoding as Magnetic Stripe of a Card with Data of Multiple Cards" issued to Jamba et al. on Dec. 29, 2015; and U.S. Pat. No. 9,224,083 B2, entitled "Multi-Functional Credit Card Type Portable Electronic Device" issued to Wyatt on Dec. 29, 2015; both of which are incorporated hereinto by reference.

The credit card of this invention includes a deformable or removable portion which remains or is removed by the user/owner. In use, once this portion has been removed, it is obvious to a merchant and signifies that a secondary identification is required for use of the credit card.

In the case of a credit card machine, when the card's identification is read, the disturbance of the credit card through the removal of a portion of the substrate, is noted and the secondary identification is required. In this manner, once the credit card has been deformed by the user/owner, the owner is assured that the card is only useable by the actual owner.

Card readers are well known in the art and include, but are not limited to those described in U.S. Pat. No. 9,230,254, entitled "Credit Card Reader Authenticator" issued to Sarifi Mehr on Jan. 5, 2016; and U.S. Pat. No. 9,208,660, entitled "Docking Device for Credit Card Payment and Cash Drawer Including the Same" issued to Cho et al. on Dec. 8, 2015; both of which are incorporated hereinto by reference.

Once the credit card is read, the information passes through various portals to obtain authorization or denial by the financial institution that issued the credit card. Those of ordinary skill in the art recognize these procedures which include, but are not limited to, those described in U.S. Pat. No. 9,154,470 B2, entitled "System and Method for Processing Transaction" issued to Lebron et al. on Oct. 6, 2015; and U.S. Pat. No. 9,225,523 B2, entitled "Authentication System and Authentication Method" issued to Itoi et al. on Dec. 29, 2015; both of which are incorporated hereinto by reference.

More specifically, the invention is a credit card which is made having a substrate which has imprinted thereon a user account number, and, a user deformable portion on the substrate. In this context, the user account number is contemplated to be raised numerals on the card, digital information stored on a RFID, and/or information contained within a magnetic strip.

In some embodiments, the deformable portion disturbs the machine readable account number. In the case of a magnetic strip, this might involve the removal of an end of the magnetic strip which signifies that a secondary ID must be used. In the case of an RFID, the deformable portion could be the complete removal of the RFID.

In either case, a credit card reader readily identifies that an owner of the credit card requires that an operator or a user of the credit card must have a secondary ID for processing the credit card.

While the preferred embodiment contemplates that when a secondary ID is required, the use of a picture ID (such as a driver's license). For an alternative embodiment, a Personal Identification Number (PIN) is to be used to identify the user of the embodiment as the owner. In this embodiment, the PIN has been previously stored with the bank or credit card issuer by the owner of the credit card.

In yet another embodiment, the secondary identification is a biological identification of a user This includes a finger print of the user or a retinal scan.

The removable of the deformable portion, for the invention, can take on any shape. In one embodiment the removable portion is square, another round, another oval, another diamond, and yet another, a triangular corner of the credit card.

The invention together with various embodiments will be more fully explained by the accompanying drawings and the following descriptions thereof.

DRAWINGS IN BRIEF

FIGS. 1A, 1B, and 1C illustrate the preferred embodiment of the credit card.

FIGS. 2A, 2B, and 2C illustrate the deformable or removable portions of some alternative embodiments of the invention.

DRAWINGS IN DETAIL

FIGS. 1A, 1B, and 1C illustrate the preferred embodiment of the credit card.

Credit card 10A has imprinted on its substrate an account number 11. Additionally, RFID 12 is also used for identification and account number. On the reverse side of the credit card, credit card 10B (FIG. 1B) is a magnetic strip 13 which also contains user information and the account number.

Perforations in the substrate allowing corner tab 14A/14B to be manually removed from the substrate as illustrated by FIG. 1C with corner 14C having been removed.

In this manner, the owner of the credit card is able to identify, to both merchants and banks, that an additional form of identification is required for the process to proceed.

Note, in this embodiment, when corner tab 14A/14B is removed, a portion 15 of magnetic tape 13 is also removed in this embodiment. In this manner, when the magnetic tape 13 is read by a credit card reader (not shown), the fact that the owner requires additional identification when the credit card is used, is machine readable and communicable to the remote financial institution (not shown).

FIGS. 2A, 2B, and 2C illustrate some alternative embodiments of the invention.

As shown in FIG. 2A, serrations 21A in substrate 20A form a circle. In this embodiment, the removable tab defined by serrations 21A encircle the RFID ship, thereby allowing a user to totally remove the RFID for security reasons.

The substrate 20B of FIG. 2B has serrations 21B formed proximate to a corner.

In FIG. 2C, serrations 21C form a triangle on the bottom of substrate 20C.

While FIGS. 2A, 2B, and 2C illustrate different removable tabs, the invention is not intended to be so limited. Any shape at any location within the substrate is contemplated for the invention.

Figure 3:
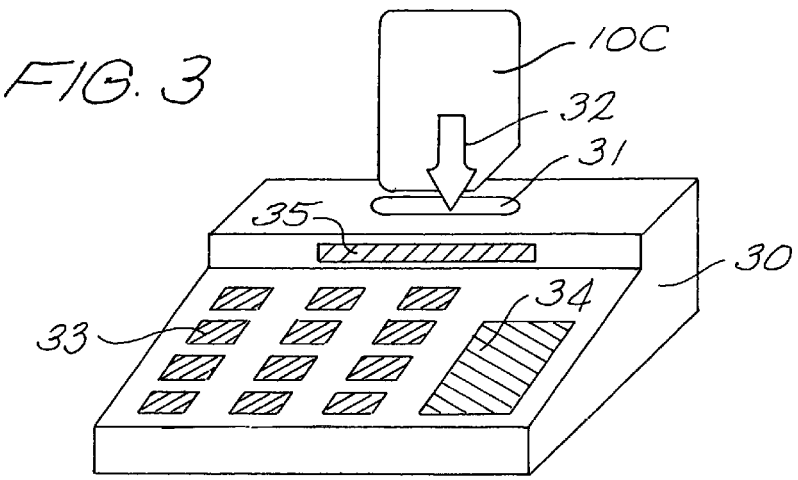
FIG. 3 illustrates an embodiment of the credit card reader.

FIG. 3 illustrates an embodiment of the credit card reader.

The user modified credit card 10C, as described in the FIG. 1 series, is inserted into slot 31 of credit card reader 30 as indicated by arrow 32. This allows the credit card reader 30 to obtain the account information from credit card 10C.

The absence of the corner of the credit card 10C is noted by credit card reader 30. This indicates that secondary user ID is required.

User input of a PIN is via key board 33. In this embodiment, fingerprint mechanism 34 is also used for selected transactions. Display 35 allows credit card reader 30 to communicate with the user.

Those of ordinary skill in the art readily recognize a variety of other configurations for the credit card reader of this invention.

Figure 4:
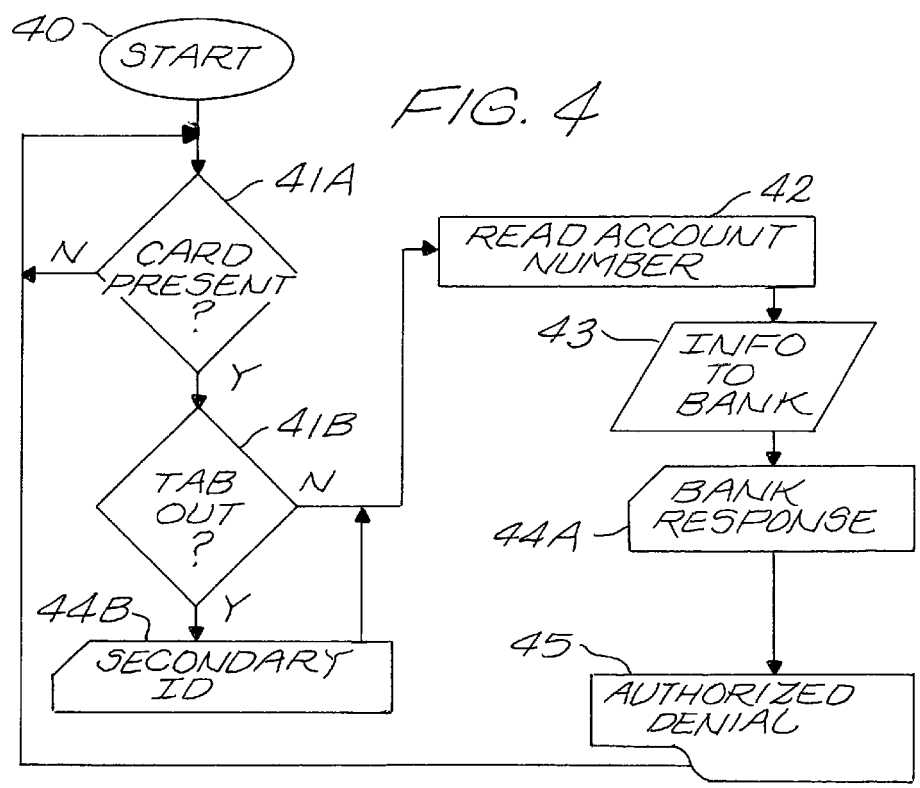
FIG. 4 is a flow chart illustrating the operation of the credit card reader.

FIG. 4 is a flow chart illustrating the operation of the credit card reader.

After the start 40, the program determines if a credit card is present 41A in the credit card reader. If no credit card is present, the program loops hack around to continue monitoring.

If a credit card is present, the program establishes if the tab has been removed by the owner 41B. This indicates that the additional step of acquiring a secondary identification is required for the process to continue to authorization.

If tab 41B has been removed, the user must provide a secondary identification 44B such as: showing a driver's license to the clerk (whereupon the clerk enters data indicating acceptance), the driver's license is scanned by the credit card reader, the user enters a PIN, a fingerprint is obtained, or any number of secondary identifications well known to those of ordinary skill in the art.

The program reads the account number 42 and the secondary information is sent to the bank or financial institution 43. The bank or financial institution produces a response 44A and this response (authorized/denies) is communicated to the user 45 (and typically to the clerk as well).

The program continues to monitor for the next credit card.

While this flow chart illustrates one operation, those of ordinary skill in the art readily recognize a variety of other structures which will serve the function outlined herein.

It is clear that the present invention provides for a highly secure and versatile credit card and reading system therefor.

What is claimed is:

1. A credit card system comprising:
   a) a substrate;
   b) a user account number secured to the substrate;
   c) a user deformable portion on the substrate being permanently removable from the substrate and discarded by a user; and,
   d) wherein a secondary user information identification is required when said deformable portion has been removed.

2. A credit card system comprising:
   a) A substrate;
   b) A machine readable user account number contained in a magnetic strip and secured to the substrate;
   c) A user deformable portion on the substrate being permanently removable from the substrate and discarded by a user, which, when removed disturbs the machine readable user account number.

3. The credit card system according to claim 1, wherein the secondary user information includes a user defined access data independent of the credit card.

4. The credit card system according to claim 1, wherein the secondary user information includes a picture identification of a user of the credit card.

5. The credit card system according to claim 1, wherein the secondary user information includes a biological identification of a user of the credit card.

6. The credit card system according to claim 5, wherein the biological identification of a user includes a finger print of the user of the credit card.

7. A credit card system comprising: a substrate having a machine readable user account number thereon; a user account number imprinted on the substrate; a user removable and disposable portion of said substrate; and, further including a secondary user information identification being required when said user removable portion has been removed.

8. The credit card system according to claim 7, wherein the secondary user information includes a user defined access data independent of the credit card.

9. The credit card system according to claim 7, wherein the secondary user information includes a picture identification of a user of the credit card.

10. The credit card system according to claim 7, wherein the secondary user information includes a biological identification of a user of the credit card.

11. A credit card system comprising:
   a substrate having a machine readable user account number thereon and, a user removable portion of said substrate;
   b) a reader accepting the substrate, said reader reading said user account number and identifying an existence of the user removable portion of said substrate, said reader communicating with a remote financial institution if the user removable portion of said substrate has not been removed from the substrate; and, wherein the reader requests a secondary user information identification when said removable portion has been disturbed.

12. The credit card system according to claim 11, wherein the secondary user information includes a user provided access data.

13. The credit card system according to claim 11, wherein the secondary user information includes a biological identification of a user of the credit card.

\* \* \* \* \*